June 6, 1961 W. J. HERSHEY 2,987,344
VEHICLE SEAT CONSTRUCTION
Filed July 15, 1960 2 Sheets-Sheet 2

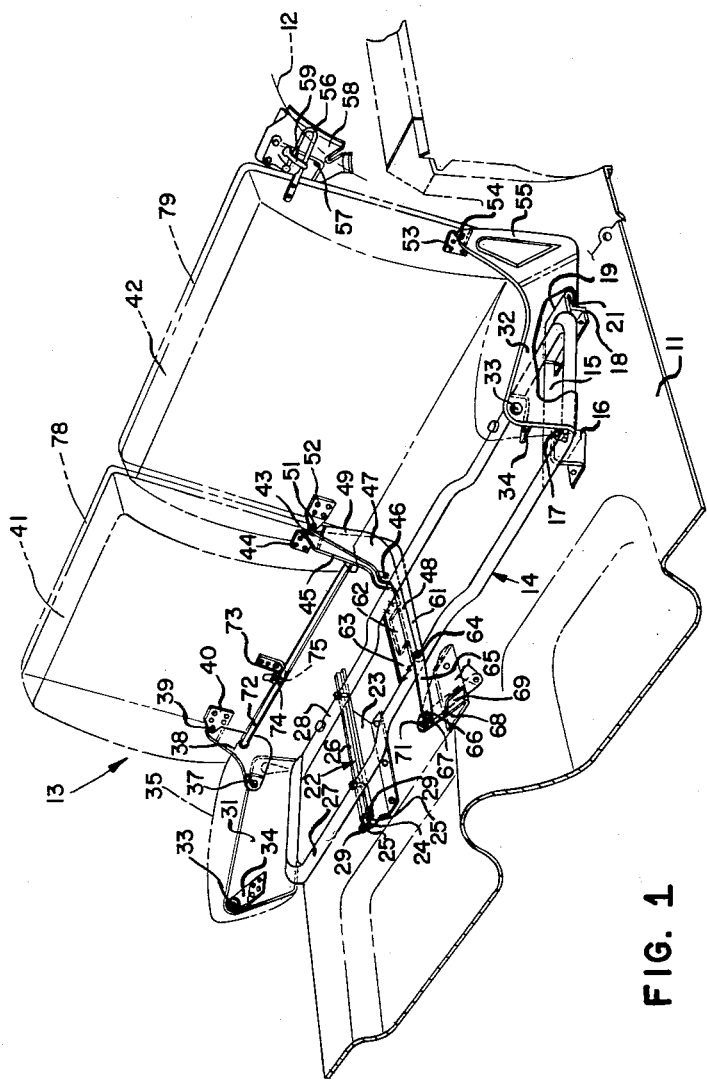

WILLARD J. HERSHEY
*INVENTOR.*

BY John R. Faulkner
John J. Roethel
ATTORNEYS

United States Patent Office 2,987,344
Patented June 6, 1961

---

2,987,344
VEHICLE SEAT CONSTRUCTION
Willard J. Hershey, Detroit, Mich., assignor to Ford Motor Company, Dearborn, Mich., a corporation of Delaware
Filed July 15, 1960, Ser. No. 43,028
8 Claims. (Cl. 296—66)

This invention relates generally to a vehicle seat construction and more particularly to a seat structure which may be folded to provide a cargo carrying floor for a combined passenger and cargo carrying vehicle or "station wagon."

Station wagons of the type having front, intermediate and rear seats, nominally designated nine passenger vehicles, are usually provided with two doors on each side. The front doors are in general alignment with the front seat and the rear doors are in general alignment with the intermediate seat. Egress and ingress to the rear seat has always presented a problem. The intermediate seat and the wheel house located rearwardly of the rear door opening in the body both present obstacles to easy access to the rear seat. In early station wagon designs, it was customary for the intermediate seat to be considerably narrower than the body width to provide sufficient space between the end of the seat and the adjacent wheel house for the passage of passengers to and from the rear seat. This, of course, limited a number of persons that could be comfortably carried on the intermediate seat, particularly if they were persons of large size.

One solution to the problem has been to divide the intermediate seat into a main seating structure and an auxiliary seating structure, the auxiliary seating structure being forwardly foldable to provide access to the rear seat. This solution is disclosed in U.S. Patent 2,677,574. Another solution to the problem of access to the rear seat has been to have this seat facing rearwardly so that the access to the seat is gained over the lowered tailgate of the vehicle. This has the disadvantage that after the passengers are seated within the vehicle, the tailgate must be closed from the outside of the vehicle. With either solution, provision had to be made so that the intermediate and rear seats can be folded flat to provide cargo carrying area in back of the front seat.

It is an object of the present invention to provide an improved construction and arrangement for the intermediate seat of a station wagon type vehicle. The improved seat structure embodying the present invention comprises a main seat frame which extends transversely of the vehicle body. This main seat frame is supported on the vehicle body floor panel for swinging movement in a plane parallel to the floor panel. An auxiliary seat assembly having the seat cushion attached thereto is pivotally connected at its forward portion to the main seat frame adjacent the forward edge of the latter. A seat back assembly, also provided with a seating cushion, is pivotally connected at its lower end to the main seat frame adjacent the rear edge of the latter. The seat back assembly is selectively swingable about one or the other of two spaced pivot axes. The selected axis about which it is swingable is controlled by a latch means. In latched condition the latch means restricts the seat back assembly to swinging movement about one of the spaced axes. When swingable about this one spaced axis, the seat back frame is operatively connected by a link means to the floor panel and is effective upon being swung in a forward direction to swing the seat structure in a horizontal plane to a forwardly angularly displaced position relative to its normal transversely extending position. Upon the latch means being released, the seat back frame is uncoupled from the link means and is freely swingable forwardly about its other pivot axis into a horizontal storage position over the main seat frame. It will be understood that before the seat back frame can be swung into a storage position over the main seat frame, the auxiliary seat frame must be swung about its pivotal connection to the main seat frame to a storage position forwardly of the latter.

One particular advantage of this construction and arrangement is that it permits the use of a solid seat cushion which is more comfortable and wider than the split version shown in U.S. Patent 2,677,574. Also, the foldable portion of the intermediate seat, as shown in this patent, required a certain amount of tugging and pulling to get the seat in the folded position and then back into normal seating position each time access to the rear seat was desired. The present construction and arrangement requires only the exertion of a slight effort to swing the seat back forwardly a sufficient distance to cause the seat structure to swivel its maximum travel.

Other objects and advantages of this invention will be made more apparent as this description proceeds, particularly when considered in connection with the accompanying drawings, wherein:

FIG. 1 is a perspective view of the vehicle seat embodying the present invention shown in normal seating position, the seat cushions being shown in phantom outline so that the mechanism therebeneath will be clearly visible;

Figure 3:
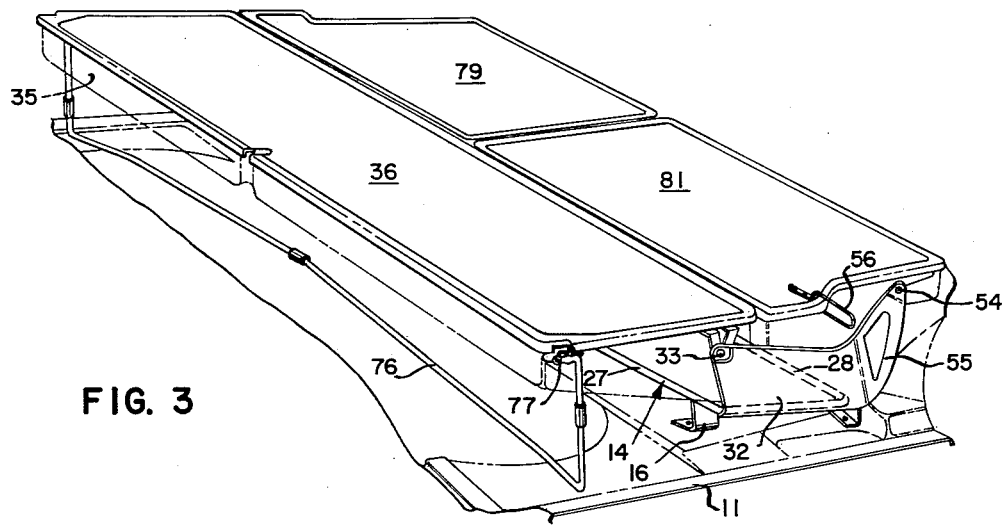
FIG. 3 is a view of the seat structure as it appears when folded to provide cargo carrying floor area.

Referring now to the drawings, the reference character 11 indicates the floor panel of a vehicle body of the station wagon type. The portion of the floor panel shown is that directly behind the front seat (not shown) and forward of the rear wheel housings of the vehicle body, the outline of the wheel housings being fragmentarily illustrated at 12. Supported on this portion of the floor panel is the second or intermediate seat, generally designated 13, to which the present invention relates. It will be understood that access to this second or intermediate seat is through a side door (not shown) of the vehicle body, the door being substantially in alignment with this seat. Access to the rear or third seat of the station wagon body is also through this same side door. Reference may be made to the aforementioned U.S. Patent 2,677,574 which, although it illustrates an older model vehicle, still represents the general construction and arrangement to be found in many current model station wagons and is of the type to which the present invention is directed.

The station wagon second or intermediate seat structure 13 embodying the present invention comprises a main frame 14 which is illustrated as being formed of tubular steel. This main frame 14 is supported in a slightly elevated position relative to the floor panel 11 and for swinging or swiveling movement in a plane substantially parallel to the plane of the floor panel 11. The swinging or swiveling movement is about a pivot axis located at the left front corner of the seat structure. It should be noted that the location of the pivot axis is with reference to the installed position of the seat structure in a conventional vehicle manufactured for the United States market. If, as in some European countries, the rear door located on the left side of the vehicle would be the door primarily used by passengers entering or leaving the vehicle, the pivot axis could be located at the right front corner of the seat structure with a corresponding reversal of other parts of the structure. The structure supporting the main frame 14 in its elevated and swingable relationship to the floor panel 14 comprises a plate member 15 welded or otherwise secured to the main frame at the left end thereof. A Z bracket 16 is bolted or otherwise secured to the floor panel at the point defining the support for the left front corner of the seat structure 13. Suitable pivot or shoulder stud means 17 couple the plate member 15 to the Z bracket, the pivot axis defined by the pivot stud means 17 being the axis about which the seat structure is swingable from the plane parallel to the floor panel 11.

The left rear corner of the seat structure 13 is supported on a second Z section bracket 18 which is slightly curved, the center of curvature being the pivot axis defined by the pivot stud 17. The plate member 15 is provided with a turned over end portion 19 which slidably engages the horizontal flange 21 of the bracket 18 so as to slidably retain the rear corner of the main frame 14 on the bracket 18.

The end of the main frame 14 opposite its pivotally supported end is supported above the floor panel 11 on a seat track assembly, generally designated 22. The seat track assembly 22 comprises a bracket 23 secured to the floor panel 11. The bracket supports an arcuate channel member 24 provided with horizontally extending side flanges 25. The channel member 24 carries an inverted arcuate channel member 26 which is secured to the front and rear cross members 27 and 28, respectively, of the main frame 14. The inverted channel member 26 is provided with turned-in edges 29 which engage the side flanges 25 of the base channel member 24. Suitable rollers or balls (not shown), as used in conventional seat track assemblies, are interposed between the two channel members 24 and 26 to remove the friction therebetween. The radius of curvature of the channel members 24 and 26 is a true radius about the center of the pivot stud 17. By virtue of the foregoing construction and arrangement, the main frame 14 is held against vertical displacement relative to the floor panel 11 while being freely swingable about the pivot stud 17.

At each end or side the main frame has welded or otherwise securely fastened thereto upright flange members 31 and 32, the flange member 31 being located at the right end of the main frame and the flange member 32 being located at the left end. Both flange members are embossed at their upper forward corners to receive a pivot stud or the like 33. Pivotally connected to each flange 31 and 32 by the pivot stud 33 are brackets 34 located at each end of the seat cushion structure 35. As in conventional station wagon constructions, the seat cushion 35 is supported on a panel 36, see FIG. 3, adapted to serve as an auxiliary floor board. When the seat cushion 35 is swung in a counterclockwise direction, as viewed in FIG. 1, about the pivot axis of the pivot studs 33, it is positionable in a storage position forwardly of the main seat frame with the panel side 36 up and extending in a substantially horizontal direction to provide part of the cargo carrying floor area of the station wagon.

Near its rear end, the flange member 31 is embossed to receive a second pivot stud 37. A hinge member 38 is pivotally connected to the flange member 31 by this pivot stud 37. The hinge member 38 is coupled by a pivot stud 39 to a bracket 40 secured to a foldable seat back assembly 41.

It should be noted that the seat back structure of the seat 13 is of two-piece construction and comprises a seat back assembly 41 and a seat back assembly 42.

The pivot stud 39 referred to above supports the outboard end of the seat back assembly 41 on the hinge member 38. The seat back assembly 41 is supported at its inboard end, that is, at the end located intermediate the ends of the main seat cushion 35, on a pivot stud 43, the inboard end of the seat back assembly 41 being provided with a suitable bracket 44. The pivot stud 43 is journalled on the upper end of a bell crank lever 45. The bell crank lever 45 is pivoted intermediate its ends on a pivot stud 46 journalled in a substantialy L-shaped bracket member 47. The center line of the pivot stud 46 and the center line of the previously described pivot 37 lie on the same line and thus define one hinge axis about which the seat back frame 41 is swingable. The center line of the pivot 43 and the center line of the pivot 39 also lie on a common line and define a second hinge axis about which the seat back frame 41 is swingable. The function of the two hinge axes will be hereinafter explained.

The bracket member 47 is provided with a substantially horizontally extending leg portion 48 which is welded or otherwise securely fastened to the forward and rear members 27 and 28, respectively, of the main frame 14. The vertically upstanding leg 49 of the bracket member 47 receives a pivot stud 51 on which is journalled a bracket 52 carried by the seat back frame assembly 42. The outboard end of the seat back frame 42 is provided with a similar bracket 53 which is pivotally coupled by a pivot stud 54 to an upstanding arm portion 55 on the side flange 32. The pivot studs 51 and 54 lie on a common pivot or hinge axis with the hinge axis defined by the pivot studs 39 and 44 of the seat back assembly 41.

The seat back assembly 42 is provided with a substantially U-shaped element 56 formed of suitable rod stock which extends laterally outwardly of the assembly. The element 56 is adapted to overlie a substantially horizontal surface 57 on an upstanding bracket member 58 which is welded or otherwise securely mounted on top of the wheel house 12. A latch element 59 is swively mounted on the upper surface 57 of the bracket 58. This construction and arrangement is such that the latch element 59 will not interfere with swinging movement of the U-shaped element 56 in a substantially horizontal plane but will prevent forward swinging movement of the seat back assembly 42 about the hinge axis defined by the pivot studs 51 and 54. Before such forward swinging movement can occur, the latch element 59 must be rotated in a counterclockwise direction, as viewed in FIG. 1, to a position out of engagement with the U-shaped element 56.

With reference to the center area of the main frame 14, the function of the bell crank lever 45 will now be described. It will be noted that the bell crank lever 45 is provided with a substantially horizontally extending arm 61. The arm 61 is provided with a laterally extending flange 62 which is adapted to underlie a plate 63 spanning the distance between the front and rear cross members 27 and 28, respectively, of the main seat frame. The abutting relationship between the flange 62 and the plate 63 defines the upward limit of swinging movement of the arm 61 of the bell crank lever 45. The forward end of the bell crank lever arm 61 is pivotally connected at 64 to one end of a link 65. The link 65 is in turn pivotally connected at its forward end by a pivot means 66 to an upstanding arm 67 which is formed on a bracket 68 secured to the floor panel 11. The arm 67 of the bracket 68 is provided with a laterally extending flange 69 which provides a stop defining the downward movement of the link 65. The end of the link 65 which is connected to the arm 67 is yieldably spaced therefrom by a spring 71 which is interposed between the two members. This, in effect, provides a limited universal connection between the two, since the link 65 will have some angular movement relative to the fixed arm 67 as the seat structure swivels about the pivot axis 17.

It will be noted that a bar 72 extends between the hinge member 38 and the upstanding leg of the bell crank lever 45. This bar provides structural reinforcement for the seat back assembly 41 and also is utilized as a part of a latch means effective to control or determine the hinge axis about which the seat back frame 41 is swingable. The seat back frame 41 has secured to its lower edge and intermediate its ends a bracket 73 provided with a spring element 74. The spring element 74 is provided with a short pin 75 which is adapted to hook into an aperture or indentation (not shown) in the upper surface of the bar 72. When this latch element pin 75 is engaged with the bar 72, the seat back assembly 41 can only be swung about the pivot axis or hinge axis defined by the pivot studs 37 and 46. When the latch element is released or lifted up so that the pin 75 becomes disengaged from the bar 72, the seat back assembly 41 is swingable about the hinge axis defined by the pivot studs 39 and 44. The result of this latched or unlatched condition of the seat back assembly 41 will become apparent as the operation of the seat structure embodying the present invention is described.

Figure 2:
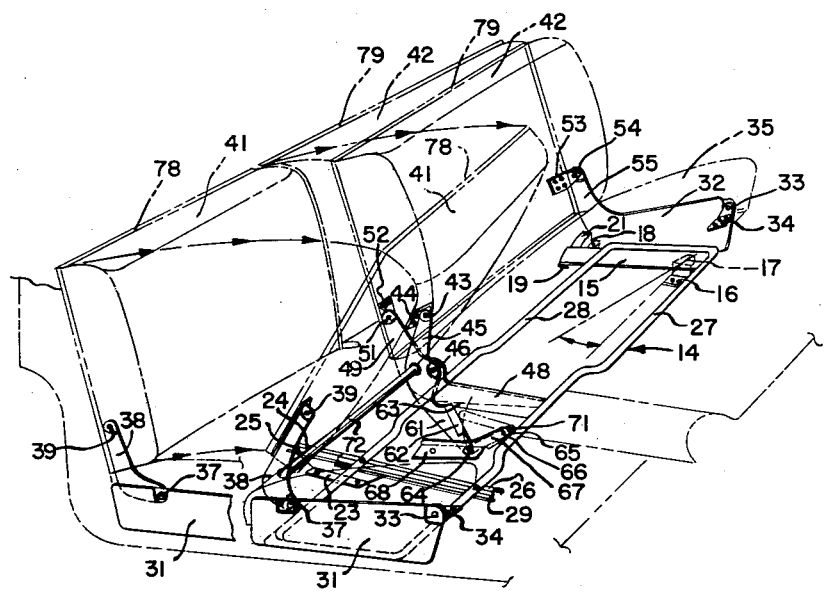
FIG. 2 is a view in part similar to FIG. 1 looking at the seat structure from the other side and illustrating normal transversely extending position of the seat structure and its horizontally angularly displaced position.

Referring now to FIG. 2, the seat structure is shown in the two positions it is adapted to occupy when in passenger carrying condition. In the one position, the seat structure extends laterally of the vehicle and both seat back assemblies 41 and 42 are in upright position. Should someone desire access to the third seat of the station wagon, it is desirable that the second seat be swung forwardly a sufficient distance to provide a clear path to the third seat seating area. All that has to be done is to grasp the upper end of the seat back assembly 41 and exert a forward and slightly downward force thereagainst. The result of the application of such force is that the seat back assembly 41 is swung about the hinge axis defined by the pivots 37 and 46. This causes the bell crank lever 45 to be swung in a clockwise direction, as viewed in FIG. 2, causing its horizontal arm 61 to be swung downwardly. Since the end of the link 65 pivotally connected to the arm 67 of the bracket 68 is fixed against movement in a fore and aft direction, the toggle action created between the link 65 and the bell crank lever arm 61 causes the right end of the seat structure to be pulled forwardly along the track assembly 22 about the pivot axis 17. This results in the right end of the seat structure being forwardly and angularly displaced from its regular normal position. The amount of this forward angular displacement can be controlled by the dimension of the various links involved, but it is readily apparent that it can be such as to provide sufficient access room to the third seat of the vehicle. Upon the seat back section assembly 41 being shoved back toward its normal position, the coaction between the bell crank arm and the link 65 will drive the main seat frame 14 back to its normal position. The relationship between the flange 62 on the bell crank arm 61 and the plate 63 is such that the pivot point 64 between the bell crank arm 61 and the link 65 will move slightly above center ensuring that the seat structure will be locked in its normal transversely extending position.

Should it be desired to fold the intermediate seat structure 13 to provide additional cargo carrying space in the station wagon, the present invention permits this to be very simply done. The first step is to swing the main seat cushion 35 about the hinge axis defined by the pivot studs 33 and 37. The seat cushion 35 is swung to position forwardly of the main seat frame 14. As in conventional station wagon practice, a bracket device comprising a rod structure 76 is pivotally connected by pivots 77 at each side to the floor board panel 36 forming the backing of the seat cushion 35. As the seat cushion 35 is inverted to bring the floor board panel 36 to an "up" position, the support or rod structure 76 will drop down and rest on the floor panel 11. The next step is to unlatch the latch pin or detent 75 from the rod 72. This is done by merely lifting upwardly on the end of the latch spring element 74 and then pushing downwardly slightly thereon to misalign the pin or detent 75 with the aperture in the rods 72. This places the seat back assembly 41 in condition to be swung about the hinge axis defined by the pivot studs 39 and 43. The direction of swinging movement is forwardly downward. When the seat cushion on the seat back assembly 41 drops into the position vacated by the seat cushion 35, the floor panel 78 forming the backing of the seat back assembly 41 will lie in a substantially flush or coplanar relationship with the floor panel 36, as seen in FIG. 3. It will be noted that when the seat frame structure 41 is swung about the hinge axis defined by the pivot studs 39 and 43, no motion is imparted to the bell crank arm 45 and therefore the main frame 14 of the seat structure is not caused to pivot about the pivot stud 17. To complete the formation of the floor board or cargo carrying area, it is only necessary to release the latch 59 holding the seat back assembly 42 in its upright position. When this latch element 59 is released, the seat back assembly 42 may be swung forwardly and downwardly about the hinge axis defined by the pivot studs 51 and 54. This places the floor panel 79 forming the backing of the seat back assembly 42 in substantially coplanar relationship with the floor panels 36 and 78.

To restore the seat structure 13 to a condition to seat passengers, the reverse sequence of operations is followed. The seat back assembly 42 may be swung upwardly and then latched by the latch element 59. The seat back frame assembly 41 may then be swung upwardly to an upstanding position in which it will be automatically retained as soon as the latch pin or detent element 75 snaps into the receiving aperture in the rod 72. Then, the main seat cushion 35 may be swung about its pivots back into normal seating position. With everything restored to an upstanding position as shown in FIG. 1, forward movement of the seat back assembly 41 would again result in angular displacement of the main frame or seat structure 13.

The principle of an angularly displaceable seat to provide greater access or passageway space to a seat located behind the movable seat has been applied to sedans of the so-called two-door type. And, of course, the principle of a foldable intermediate seat to provide additional cargo carrying space has been applied to station wagons. The construction and arrangement embodying the present invention, however, is believed to be the first combining both an angularly movable and a foldable seat structure for use in station wagons.

It will be understood that the invention is not to be limited to the exact construction shown and described, but that various changes and modifications may be made without departing from the spirit and scope of the invention as defined in the appended claims.

I claim:

1. In a vehicle body having a supporting floor structure, a seat structure comprising a horizontal seat frame extending transversely of said vehicle body, means supporting said seat frame on said floor structure for swinging movement about a substantially vertical pivot axis, flange means secured to said seat frame, horizontal seat means pivotally mounted on said flange means for swinging movement from a position above said seat frame to a stored position above said floor structure and forwardly of said seat frame, and a seat back assembly, means pivotally supporting said seat back assembly adjacent the rear edge of said seat frame, said seat back assembly being forwardly swingable about a first axis into the space above said seat frame after said seat cushion has been swung into its stored position, latch means releasably restraining said set back assembly against swinging movement about said first axis, said seat back assembly when in latched condition being swingable about a second axis, and means connecting said seat back assembly to said floor structure and operative upon said seat back assembly being swung about said second axis to swing said seat structure about said vertical pivot axis to a forwardly angularly displaced position relative to its transversely extending position.

2. In a vehicle body having a supporting floor structure, a seat structure comprising a horizontal seat frame extending transversely of said vehicle body, means supporting said seat frame on said floor structure for swinging movement about a substantially vertical pivot axis, flange means secured to said seat frame, horizontal seat means pivotally mounted on said flange means for swinging movement from a position above said seat frame to a stored position above said floor structure and forwardly of said seat frame, and a seat back assembly, means pivotally supporting said seat back assembly adjacent the rear edge of said seat frame, said seat back assembly being forwardly swingable about a first axis into the space above said seat frame after said seat cushion has been swung into its stored position, the undesired of said seat cushion and the back of said seat back assembly when both are in stored position being inverted into a substantially coplanar parallel relationship to said floor structure to provide a cargo carrying floor structure, latch means releasably restraining said seat back assembly against swinging movement about said first axis, said seat back assembly when in latched condition being swingable about a second axis, and means connecting said seat back assembly to said floor structure and operative upon said seat back assembly being swung about said second axis to swing said seat structure about said vertical pivot axis to a forwardly angularly displaced position relative to its normal transversely extending position.

3. In a vehicle body having a supporting floor structure, a seat structure comprising a horizontal seat frame extending transversely of said vehicle body, means supporting said seat frame on said floor structure for swinging movement about a substantially vertical pivot axis, side means secured to said seat frame, horizontal seat means pivotally mounted on said side means for swinging movement from a position above said seat frame to a stored position above said floor structure and forwardly of said seat frame, and a seat back assembly, hinge means pivotally mounted on said side means adjacent the rear edge of said seat frame, means pivotally supporting said seat back assembly on said hinge means, said seat back assembly being forwardly swingable about the axis of the pivot means supporting the same on said hinge means into the space above said seat frame after said seat cushion has been swung into its stored position, latch means releasably restraining said seat back assembly against swinging movement about said pivot means axis, said seat back assembly when in latched condition being coupled to said hinge means and swingable about the pivot axis thereof, and means connecting said seat back assembly to said floor structure and operative upon said seat back assembly being swung about said hinge means pivot axis to swing said seat structure about said vertical pivot axis to a forwardly angularly displaced position relative to its normal transversely extending position.

4. In a vehicle body having a supporting floor structure, a seat structure comprising a horizontal seat frame extending transversely of said vehicle body, means supporting said seat frame on said floor structure for swinging movement about a substantially vertical pivot axis, side means secured to said seat frame, horizontal seat means pivotally mounted on said side means for swinging movement from a position above said seat frame to a stored position above said floor structure and forwardly of said seat frame, and a seat back assembly, hinge means pivotally mounted on said side means adjacent the rear edge of said seat frame, means pivotally supporting said seat back assembly on said hinge means, said seat back assembly being forwardly swingable about the axis of the pivot means supporting the same on said hinge means into the space above said seat frame after said seat cushion has been swung into its stored position, the underside of said seat cushion and the back of said seat back assembly when both are in stored position being inverted into a substantially coplanar parallel relationship to said floor structure to provide a cargo carrying floor structure, latch means releasably restraining said seat back assembly against swinging movement about said pivot means axis, said seat back assembly when in latched condition being coupled to said hinge means and swingable about the pivot axis thereof, and means connecting said seat back assembly to said floor structure and operative upon said seat back assembly being swung about said hinge means pivot axis to swing said seat structure about said vertical pivot axis to a forwardly angularly displaced position relative to its normal transversely extending position.

5. In a combined passenger and cargo carrying vehicle having a floor panel, a seat structure comprising a main seat frame extending transversely of said vehicle, means supporting said seat frame on said floor panel for swinging movement in a plane parallel to the latter, an auxiliary seat frame, means pivotally connecting the forward portion of said auxiliary seat frame to said main seat frame adjacent the forward edge thereof, a seat back assembly, means pivotally connecting the lower end of said seat back assembly to the main seat frame adjacent the rear edge thereof for selective swinging movement about one or the other of two spaced pivot axes, latch means releasably restricting said seat back assembly to swinging movement about one of said spaced pivot axes, link means operatively connecting said seat back assembly to said floor panel and effective upon said seat back assembly being swung about said one pivot axis to swing said seat structure to a forwardly angularly displaced position relative to its transversely extending position, said latch means upon being released uncoupling said seat back assembly from said link means and permitting said seat back assembly to be swung forwardly about the other pivot axis into a horizontal storage position over said main seat frame after said auxiliary seat frame is swung about the pivot means connecting the latter to said main frame into a storage position forwardly of the latter.

6. In a combined passenger and cargo carrying vehicle having a floor panel, a seat structure comprising a main seat frame extending transversely of said vehicle, means supporting said seat frame on said floor panel for swinging movement in a plane parallel to the latter, an auxiliary seat frame, means pivotally connecting the forward portion of said auxiliary seat frame to said main seat frame adjacent the forward edge thereof, a seat back assembly, means pivotally connecting the lower end of said seat back assembly to the main seat frame adjacent the rear edge thereof for selective swinging movement about one or the other of two spaced pivot axes, latch means releasably restricting said seat back assembly to swinging movement about one of said spaced pivot axes, link means operatively connecting said seat back assembly to said floor panel and effective upon said seat back assembly being swung about said one pivot axis to swing said seat structure to a forwardly angularly displaced position relative to its transversely extending position, said latch means upon being released uncoupling said seat back assembly from said link means and permitting said seat back assembly to be swung forwardly into a horizontal storage position over said main seat frame after said auxiliary seat frame is swung about the pivot means connecting the latter to said main frame into a storage position forwardly of the latter, the inverse sides of said auxiliary frame and seat back assembly in the storage positions of the latter being in a substantially coplanar relationship to provide a cargo carrying floor above the stored auxiliary and seat back assembly.

7. In a combined passenger and cargo carrying vehicle having a floor panel, a seat structure comprising a main seat frame extending transversely of said vehicle, means supporting said seat frame on said floor panel for swinging movement in a plane parallel to the latter, an auxiliary seat frame, means pivotally connecting the forward portion of said auxiliary seat frame to said main seat frame adjacent the forward edge thereof, a seat back assembly, hinge means pivotally connected to the main seat frame adjacent the rear edge thereof, means pivotally connecting said seat back assembly to said hinge means for swinging movement about an axis spaced from the hinge means pivot axis, latch means releasably coupling said seat back assembly to said hinge means for swinging movement about said hinge means pivot axis, link means operatively connecting said seat back assembly to said floor panel and effective upon said seat back assembly being swung about said hinge means axis to swing said seat structure to a forwardly angularly displaced position relative to its transversely extending position, said latch means upon being released permitting said seat back assembly to be swung forwardly about the axis spaced from said hinge means pivot axis into a horizontal storage position over said main seat frame after said auxiliary seat frame is swung about the pivot means connecting the latter to said main frame into a storage position forwardly of the latter.

8. In a combined passenger and cargo carrying vehicle having a floor panel, a seat structure comprising a main seat frame extending transversely of said vehicle, means supporting said seat frame on said floor panel for swinging movement in a plane parallel to the latter, an auxiliary seat frame, means pivotally connecting the forward portion of said auxiliary seat frame to said main seat frame adjacent the forward edge thereof, a seat back assembly, hinge means pivotally connected to the main seat frame adjacent the rear edge thereof, means pivotally connecting said seat back assembly to said hinge means for swinging movement about an axis spaced from the hinge means pivot axis, latch means releasably coupling said seat back assembly to said hinge means for swinging movement about said hinge means pivot axis, link means operatively connecting said seat back assembly to said floor panel and effective upon said seat back assembly being swung about said hinge means axis to swing said seat structure to a forwardly angularly displaced position relative to its transversely extending position, said latch means upon being released permitting said seat back assembly to be swung forwardly about the axis spaced from said hinge means pivot axis into a horizontal storage position over said main seat frame after said auxiliary seat frame is swung about the pivot means connecting the latter to said main frame into a storage position forwardly of the latter, the inverse sides of said auxiliary frame and seat back assembly in the storage positions of the latter being in a substantially coplanar relationship to provide a cargo carrying floor above the stored auxiliary and seat back assembly.

References Cited in the file of this patent
UNITED STATES PATENTS

| | | |
|---|---|---|
| 2,677,574 | Golubics | May 4, 1954 |
| 2,681,688 | Haltenberger | June 22, 1954 |